US012475369B2

(12) United States Patent
Fernandes et al.

(10) Patent No.: US 12,475,369 B2
(45) Date of Patent: Nov. 18, 2025

(54) BUILDING AND EXECUTING DEEP LEARNING-BASED DATA PIPELINES

(71) Applicant: Capital One Financial Corporation, McLean, VA (US)

(72) Inventors: Kenrick Fernandes, Wheeling, IL (US); Ryan Franks, Deerfield, IL (US); Arjun Ravi Kannan, Buffalo Grove, IL (US)

(73) Assignee: Capital One Financial Corporation, McLean, VA (US)

(*) Notice: Subject to any disclaimer, the term of this patent is extended or adjusted under 35 U.S.C. 154(b) by 875 days.

(21) Appl. No.: 17/566,885

(22) Filed: Dec. 31, 2021

(65) Prior Publication Data

US 2023/0214640 A1   Jul. 6, 2023

(51) Int. Cl.
*G06N 3/08* (2023.01)

(52) U.S. Cl.
CPC ...................... *G06N 3/08* (2013.01)

(58) Field of Classification Search
CPC ............. G06N 3/04; G06N 3/08; G06N 3/063
See application file for complete search history.

(56) References Cited

U.S. PATENT DOCUMENTS

| 10,977,336 B2 | 4/2021 | Unger et al. |
| 2019/0228343 A1 | 7/2019 | Gu et al. |
| 2019/0273509 A1* | 9/2019 | Elkind ...................... G06N 3/08 |
| 2021/0334629 A1* | 10/2021 | Yuan ......................... G06N 3/08 |
| 2021/0349912 A1 | 11/2021 | Kania et al. |

OTHER PUBLICATIONS

Kumar, Satyam. Stop One-Hot Encoding your Time-based Features: Essential guide to feature transformation for cyclic features. Towards Data Science, Aug. 21, 2021, pp. 7 [online], [retrieved on Dec. 1, 2021]. Retrieved from the Internet <URL: https://towardsdatascience.com/stop-one-hot-encoding-your-time-based-features-24c699face2f>.

(Continued)

*Primary Examiner* — Kamran Afshar
*Assistant Examiner* — Brian J Hales
(74) *Attorney, Agent, or Firm* — Lee Sullivan Shea & Smith LLP

(57) ABSTRACT

An example computing platform is configured to receive configuration data that defines a pipeline for building a deep learning model, the configuration data including data defining an input dataset, data type assignments for a set of input data variables included within the dataset, data transformations that are to be applied to the dataset, and a machine learning process that is to be utilized to train the deep learning model. Based on the received configuration data, the computing platform functions to build the deep learning model by obtaining the input dataset, assigning a data type to data in the dataset, selecting transformation operations for the data in the dataset, splitting the dataset into a sequence of data blocks, applying the transformation operations to each data block to produce a transformed dataset, generating a compressed data structure that includes the transformed datasets, and applying the machine learning process to the transformed datasets.

20 Claims, 5 Drawing Sheets

(56) References Cited

OTHER PUBLICATIONS

The TFX User Guide. TensorFlow. Nov. 19, 2021, pp. 19 [online], [retrieved on Dec. 2, 2021]. Retrieved from the internet <URL:https://www.tensorflow.org/tfx/guide#tfx_standard_components>.
Understanding TFX Pipelines. TensorFlow. Jan. 28, 2021, p. 6 [online], [retrieved on Dec. 2, 2021]. Retrieved from the inernet <URL: https://www.tensorflow.org/tfx/guide/understanding_tfx_pipelines>.
International Searching Authority. International Search Report and Written Opinion issued in International Application No. PCT/US2022/053128, mailed on Apr. 26, 2023, 11 pages.

* cited by examiner

BUILDING AND EXECUTING DEEP LEARNING-BASED DATA PIPELINES

BACKGROUND

Organizations in many different industries have begun to operate computing platforms that are configured to ingest, process, analyze, generate, store, and/or output data that is relevant to the businesses of those organizations. Such computing platforms are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Data platforms such as these may provide several benefits to organizations, including but not limited to enabling organizations to achieve efficiencies in data management and analysis and enabling organizations to unlock the value of their data in ways not previously possible, which may lead to more informed business decisions and new business opportunities. Data platforms may provide various other advantages as well.

OVERVIEW

In one aspect, disclosed herein is a method that involves a computing platform: (i) receiving configuration data that defines a pipeline for building a deep learning model, wherein the received configuration data comprises configuration data defining (a) an input dataset for the pipeline, (b) data type assignments for a set of input data variables included within the input dataset, (c) data transformations that are to be applied to the input dataset, and (d) a machine learning process that is to be utilized to train the deep learning model; and (ii) based on the received configuration data, deploying the pipeline for building the deep learning model, wherein, while the pipeline for building the deep learning model is deployed, the computing platform functions to build the deep learning model by: (a) obtaining the input dataset that is defined by the configuration data, wherein the input dataset comprises a respective dataset for each respective input data variable in the set of input data variables; (b) for each respective input data variable in the set of input data variables: (1) assigning a given data type to the respective dataset for the respective input data variable based at least in part on the configuration data defining the data type assignments; (2) based on the given data type assigned to the respective dataset for the respective input data variable and the configuration data defining the data transformations that are to be applied to the input dataset, selecting a given set of one or more transformation operations that are to be applied to the respective dataset for the respective input data variable; (3) splitting the respective dataset for the respective input data variable into a respective sequence of data blocks for the respective input data variable; and (4) applying the given set of one or more transformation operations to each data block in the respective sequence of data blocks for the respective input data variable in order to produce a transformed dataset for the respective input data variable; (c) generating a compressed data structure that includes the transformed datasets for the set of input data variables; and (d) applying the machine learning process defined by the configuration data to the transformed datasets for the set of input data variables that are included within the compressed data structure.

In another aspect, disclosed herein is a computing platform that includes at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable medium comprising program instructions that are executable to cause a computing platform to carry out the functions disclosed herein, including but not limited to the functions of the foregoing method.

One of ordinary skill in the art will appreciate these as well as numerous other aspects in reading the following disclosure.

Figure 1:
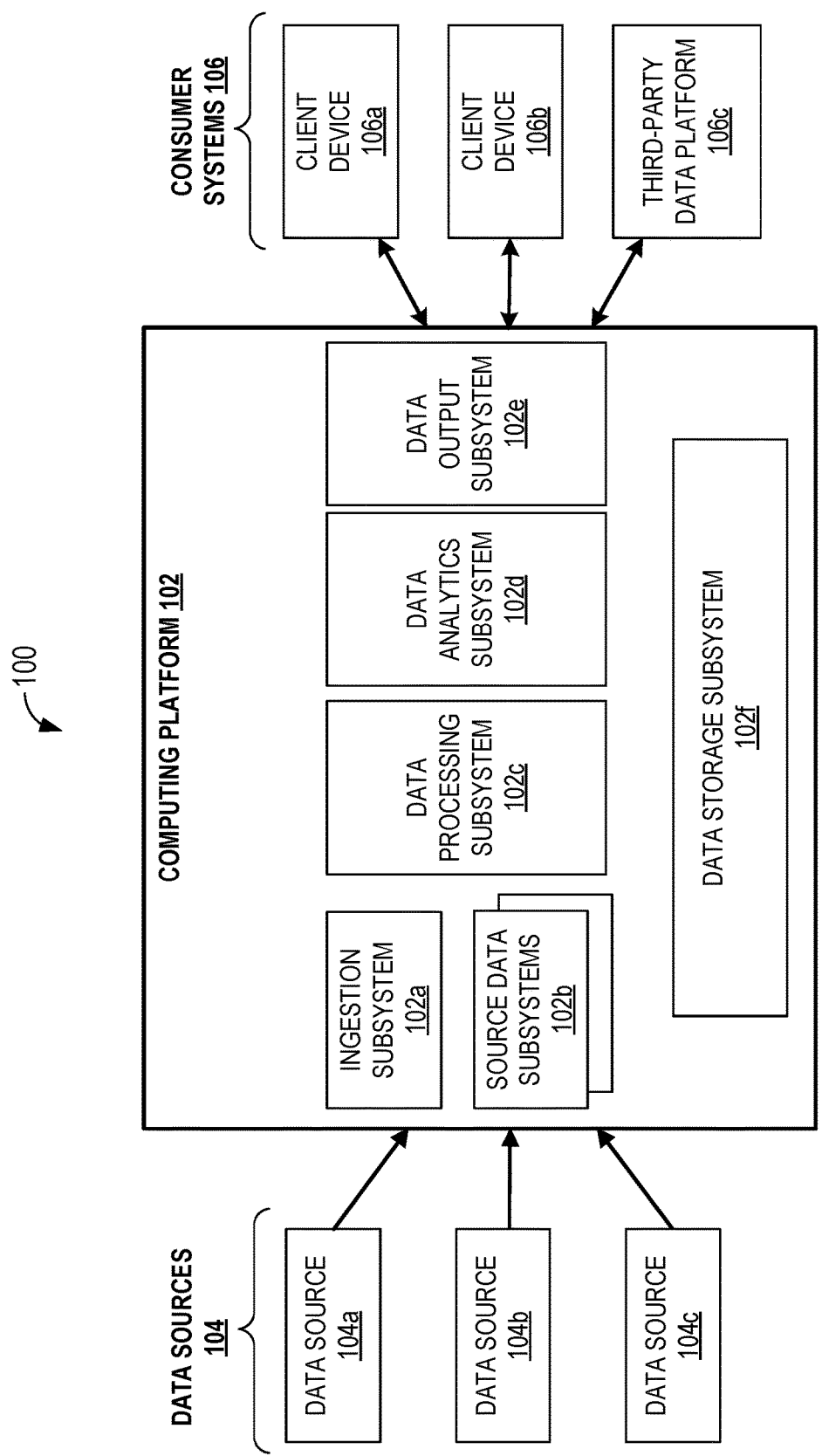
FIG. 1 depicts an example network environment in which aspects of the disclosed technology may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK ENVIRONMENT

As noted above, organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins, as well as call logs, chat logs, and/or complaints), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102. For example, if the example computing platform 102 comprises a data platform operated by a financial institution, the one or more source data subsystems 102b may comprise functional subsystems that internally generate and output certain types of data related to customer accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102d may be configured to carry out data analytics operations in order to derive certain types of insights that are relevant to the financial institution's business, examples of which could include predictions of fraud or other suspicious activity on a customer's account and predictions of whether to extend credit to an existing or prospective customer, among other possibilities. The data analytics subsystem 102d may be configured to carry out any of numerous other types of data analytics operations as well.

Moreover, the data analytics operations carried out by the data analytics subsystem 102d may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102d may be embodied in other forms as well.

Referring again to FIG. 1, the example computing platform 102 may also comprise a data output subsystem 102e that is configured to output data (e.g., processed data and/or derived insights) to certain consumer systems 106 over respective communication paths. These consumer systems 106 may take any of various forms.

For instance, as one possibility, the data output subsystem 102e may be configured to output certain data to client devices that are running software applications for accessing and interacting with the example computing platform 102, such as the two representative client devices 106a and 106b shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102. Further, the software applications for accessing and interacting with the example computing platform 102 that run on these client devices may take any of various forms, which may depend at least in part on the type of user and the type of organization operating the example computing platform 102. As another possibility, the data output subsystem 102e may also be configured to output certain data to other third-party data platforms, such as the representative third-party data platform 106c shown in FIG. 1.

In order to facilitate this functionality for outputting data to the consumer systems 106, the data output subsystem 102e may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102e may be configured to output data to other types of consumer systems 106 as well.

Referring once more to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transaction Processing (OLTP) databases), columnar databases (e.g., Online Analytical Processing (OLAP) databases), NoSQL databases, data warehouses, data lakes, and message queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise computing infrastructure of a public, private, and/or hybrid cloud (e.g., computing and/or storage clusters). In this respect, the organization that operates the example computing platform 102 may either supply its own cloud infrastructure or may obtain the cloud infrastructure from a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise one or more servers that are owned and operated by the organization that operates the example computing platform 102. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that the network environment 100 is one example of a network environment in which a data platform may be operated, and that numerous other examples of network environments, data platforms, data sources, and consumer systems are possible as well.

II. BUILDING DATA SCIENCE MODELS

As noted above, one key aspect of most data platforms today is the use of data science models to carry out data analytics and derive insights based on data that is available within the data platform. Data science models may provide certain advantages over alternate forms of data analytics such as user-defined rules. For instance, unlike most user-defined rules, data science models are created through a data-driven process that involves analyzing and learning from historical data, and as a result, data science models are capable of deriving certain types of insights from data that are simply not possible with user-defined rules—including insights that are based on data-driven predictions of outcomes, behaviors, trends, or the like and insights that can only be revealed through an understanding of complex interrelationships between multiple different data variables. Further, unlike most user-defined rules, data science models are capable of being updated and improved over time through a data-driven process that re-evaluates model performance based on newly available data and then adjusts the data science models accordingly. Further yet, data science models may be capable of deriving certain types of insights (e.g., complex insights) in a quicker and/or more efficient manner than other forms of data analytics such as user-defined rules. Depending on the nature of the available data and the types of insights that are desired, data science models may provide other advantages over alternate forms of data analytics as well.

However, before a data science model can be used by a data platform to carry out data analytics and derive insights based on data that is available within the data platform, that data science model first needs to be created through a data-driven process like the one mentioned above. Unfortunately, such a process for creating a data science model is typically a time-consuming, complex, and labor-intensive endeavor that involves many different stages and may require collaboration and input by multiple different professionals, including data scientists, developers, engineers, and/or data analysts.

For instance, a typical process for creating a data science model may begin with a first stage during which the initial dataset that is to be used for the creation of the data science model is selected and obtained. In practice, this initial dataset could either comprise data that is already available within the data platform (e.g., source data and/or processed data), data that is ingested from other data sources, or some combination thereof.

After the initial dataset is obtained, the process may proceed to a second stage during which processing operations similar to those described above are applied to the initial dataset in order to prepare that initial dataset for further analysis and use within the model creation process. In turn, the process typically proceeds to a third stage during which exploratory data analysis (EDA) is performed by one or more data scientists or data analysts in order to gain a better understanding of the initial dataset. This exploratory analysis may involve various tasks, including but not limited to reviewing and visualizing the dataset and then performing feature engineering on the dataset in order to define which features are to be used for model training and what types of processing operations need to be performed on the source data in order to derive those features.

Once the features are defined, the process may proceed to a fourth stage during which the initial dataset is processed in order to derive one or more feature datasets that are to be used during the process of building the data science model. For example, the initial dataset may be processed in order to derive a training dataset that may be used for the initial training of the data science model, a validation dataset that may be used during the course of the training process to assist with certain aspects of that process, and/or a test dataset that may be used to test and evaluate the trained data science model, among other possibilities.

Next, the process may proceed to a fifth stage during which the training dataset is used to build the data science model. At the beginning of this stage, data scientists or other professionals will select which one or more machine learning techniques are to be applied to the training dataset in order to train the data science model, and may also perform other configuration tasks such as selecting an initial set of hyperparameters for the data science model, among other possibilities. In turn, one or more machine learning techniques are applied to the training dataset in order to train the data science model. The one or more machine learning techniques that are applied could take any of various forms, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, in some implementations, this stage may involve training multiple different "candidate" models using different machine learning techniques and/or hyperparameters, which may then be evaluated and compared during the next stage in order to select which particular combination of machine learning technique(s) and hyperparameters are to be used for the data science model.

During the training stage, the validation dataset may also be used to assist with certain aspects of the training process for the data science model, such as selecting the hyperparameters and/or determining when to stop the training process (e.g., to avoid overfitting).

After the training stage, the process may proceed to a sixth stage during which the test dataset is used to evaluate the data science model (or the set of candidate models). This stage may involve inputting the test dataset into the one or more trained models and then evaluating and validating the performance of the one or more trained models by comparing each trained model's outputs to "ground truth" data included within the test dataset. Additionally, to the extent there are multiple candidate models that have been trained in the fifth stage, this stage may involve comparing the performance of those trained candidate models in order to select which trained candidate model to use as the data science model that is to be deployed.

Based on the evaluation performed during the sixth stage, the process may then proceed to a seventh stage during which the hyperparameters and/or features of the data science model are updated in an effort to further optimize (or at least improve) the performance of the trained data science model.

After the training and updating of the data science model has been completed, the process may optionally proceed to an eighth stage during which data scientist or other professionals may define any additional processing operations that are to be performed on the output of the data science model in order to produce insights based on the model's output. Depending on the nature of the data science model, this stage could involve any of various tasks, including but not limited to setting a threshold that is to be applied to the model's output in order to translate that output into a Boolean data type (e.g., translating a likelihood value into a "yes" or "no" answer).

After the configuration of the data science model has been finalized, the process may proceed to a ninth stage during which the data science model is prepared and/or packaged up for deployment within the data platform. This may involve preparing and/or packaging up the trained data science model itself (which is sometimes referred to as a "model object" or a "model artifact"), configuration data related to the inputs and outputs of the data science model (e.g., configuration data that defines the specific source variables for the model, the specific feature variables for the model, the processing operations that are to be performed in order to derive the feature variables from the source variables, and any additional processing operations that are to be performed on the output of the data science model in order to produce insights based on the model's output), and any other configuration data that is needed to integrate the data science model into the production environment of the data platform (e.g., libraries or the like).

Once all of these steps have been completed, the data science model can then be deployed within the data platform so that it can be run on live data within the data platform, which may generally involve tasks for integrating the data science model into the production environment of the data platform. For instance, in the context of FIG. 1, the data science model may be deployed as part of the data analytics subsystem 102d of the computing platform 102. However, it should be understood that this is merely intended to serve as one illustrative example, and that the data science model could be deployed on any computing system that has sufficient computing resources to execute the data science model.

Thereafter, it is also possible that at least a portion of the process described above may be repeated one or more times in the future in order to update the data science model based on newly available data.

It should also be understood that the process of building a data science model could take various other forms as well—including but not limited to the possibility that certain ones of the stages discussed above could take different forms and/or take place in a different order. For example, instead of starting with one initial dataset and then using that one initial dataset to generate multiple different feature datasets during the fourth stage described above, it is possible that multiple different initial datasets could be defined and obtained as part of the first stage of the process, where each such initial dataset is then used to derive a corresponding feature dataset that is to be used for building the data science model (e.g., a first initial dataset for use in deriving a training dataset, a second initial dataset for use in deriving a validation dataset, a third initial dataset for use in deriving a test dataset, etc.). Other examples are possible as well.

Given the time-consuming, complex, and labor-intensive nature of the process for creating a data science model, there is a growing demand for software technology that can facilitate and accelerate the model creation process, and to address this demand, some software providers have begun to offer software applications that can assist professionals such as data scientists, developers, engineers, and/or data analysts in performing certain tasks during the model creation process. However, these software applications still have various limitations and drawbacks.

For instance, one such limitation is that existing software applications do not provide data scientists with the ability to quickly and efficiently configure and deploy an end-to-end "pipeline" for building a data science model. Another limitation is that existing software applications are not well suited for processing certain types of input data and/or training certain types of data science models such as deep learning models. Yet another limitation is that existing software applications often do not provide the full range of functionalities that may be needed by a data scientist in order to facilitate the end-to-end process of creating a data science module, including but not limited to functionalities related to loading a dataset, applying processing operations to the dataset, training a data science model based on the dataset, evaluating a trained data science model, and perhaps also updating a trained data science model, among others.

To address these and other limitations, disclosed herein is software technology that improves the process of building a data science model. One aspect of the disclosed software technology comprises functionality that enables data scientists and other professionals to configure a pipeline for training a data science model that takes the form of a deep learning model, which may be referred to herein as a "deep learning-based pipeline." Another aspect of the disclosed software technology comprises functionality for deploying a deep learning-based pipeline after it has been configured in order to train a deep learning model. Yet another aspect of the disclosed software technology comprises functionality for evaluating and/or updating a trained deep learning model before the trained deep learning model is deployed into a production environment. The disclosed software technology may comprise various other functionality that helps facilitate the process of building a data science model as well, which is described in further detail below.

In practice, the disclosed software technology may be implemented in the form of a new functional subsystem for building data science models, which could be installed on the same computing platform that is configured to execute data science models that are built using the new functional subsystem (e.g., the computing platform 102) or some other computing platform. Further, in practice, the new functional subsystem may have a network-accessible interface such as an API that facilitates interaction with users such as data scientists during the process of building a deep learning model. In this respect, the different functionalities of the new functional subsystem that are exposed to users via the API may also be referred to herein as a "toolkit" or "toolbox" for building deep learning models.

III. EXAMPLE SUBSYSTEM FOR BUILDING DATA SCIENCE MODELS

Figure 2:
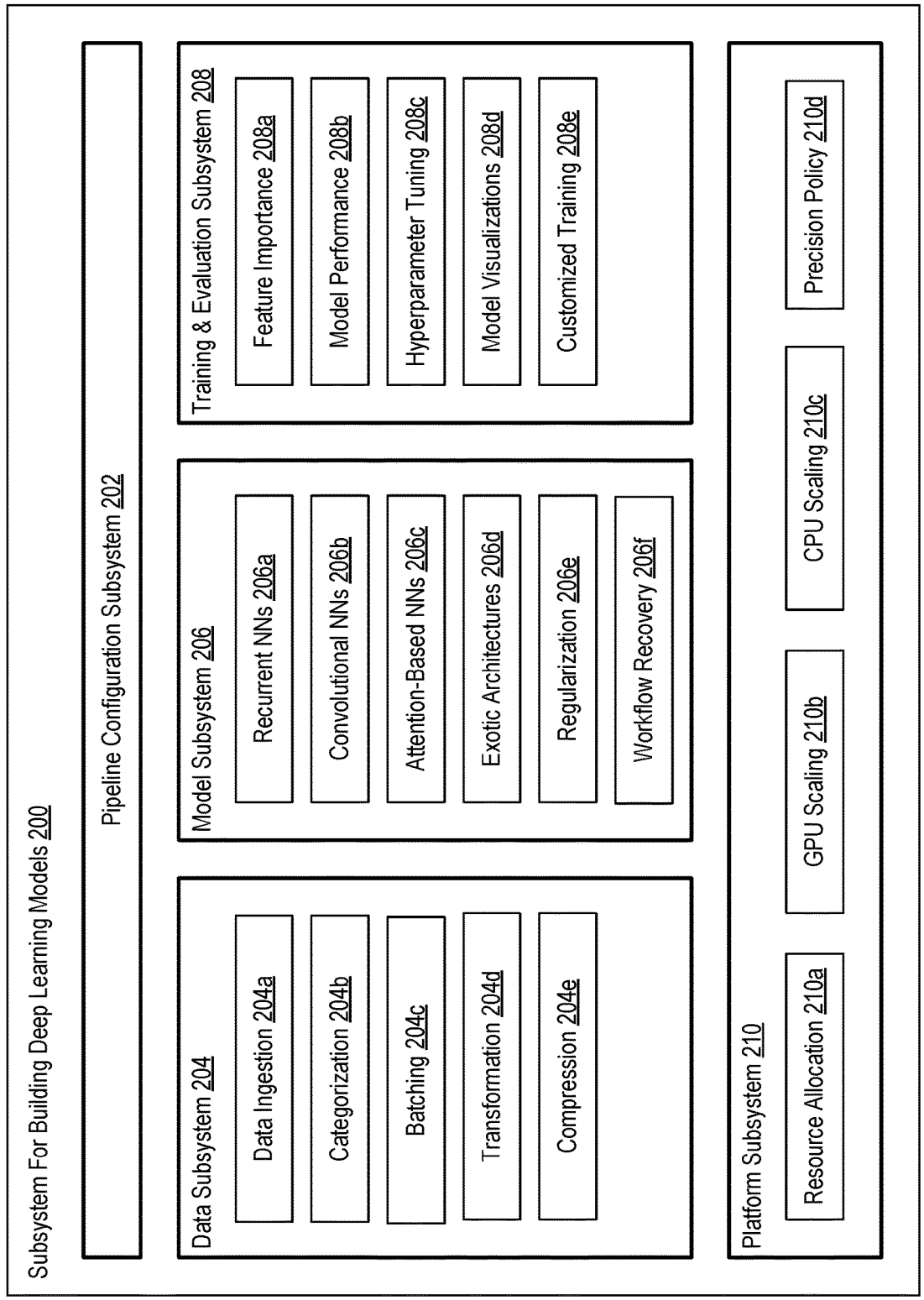
FIG. 2 depicts an example architecture of a functional subsystem for building data science models according to aspects of the disclosed technology.

FIG. 2 depicts an example architecture of a new functional subsystem 200 for building data science models, which may itself comprise a collection of functional subsystems that are each configured to provide a certain set of functionality that facilities the process of building a data science model.

For instance, as shown in FIG. 2, the example subsystem 200 for building data science models may include five functional subsystems—(i) a pipeline configuration subsystem 202, (ii) a data subsystem 204, (iii) a model subsystem 206, (iv) a training and evaluation subsystem 208, and (v) a platform subsystem 210. Each of these functional subsystems will now be described in further detail.

At times below, the example subsystem 200 may be described in the context of building a deep learning model for analyzing financial data that may be available to a financial institution, but it should be understood that (i) the example subsystem 200 may be used to build other types of data science models beyond deep learning models and (ii) the example subsystem 200 may be used to build data science models for analyzing other types of data found in other industries as well.

a. Pipeline Configuration Subsystem

At a high level, the pipeline configuration subsystem 202 may be configured to (i) provide a network-accessible interface such as an API through which a data scientist or other user may provide configuration information that defines a deep learning-based pipeline for building a deep learning model and (ii) configure a new deep learning-based pipeline for deployment based on configuration information that is provided through the API. As described in further detail below, this configuration information may take various forms, examples of which may include (i) configuration information specifying an input dataset for the pipeline, (ii) configuration information specifying data type assignments for a set of input data variables included within the input dataset, (iii) configuration information specifying data transformations that are to be applied to the input dataset, and (iv) configuration information specifying a machine learning process that is to be utilized to train the deep learning model, among other possibilities.

In practice, the pipeline configuration subsystem 202 may receive such configuration information in the form of configuration data that is provided to the pipeline configuration subsystem 202 through the API. Such configuration data may take various forms. As one example, such configuration data may comprise a set of structured data (e.g., a JSON file) that is passed into the API from a user's client station. As another example, such configuration data may comprise one or more configuration files containing code that, when executed by the pipeline configuration subsystem 202, cause the pipeline configuration subsystem 202 to operate in accordance with instructions in the configuration file. In this respect, the configuration file itself may be passed into the API from a user's client station, or alternatively, an identifier of a storage location of a configuration file may be passed into the API from a user's client station and the pipeline configuration subsystem 202 may then retrieve the one or more configuration files from the storage location and cause the example subsystem 200 to execute the configuration instructions in the one or more configuration files. The pipeline configuration subsystem 202 may receive configuration information in various other forms as well.

b. Data Subsystem

At a high level, the data subsystem 204 may be configured to perform the functions of a deployed deep learning-based pipeline that are related to obtaining an input dataset for training a deep learning model and then transforming that input dataset into a feature dataset for training a deep learning model (i.e., a training dataset). The data subsystem 204 may accomplish these tasks in various ways, and in some examples, the data subsystem 204 may include one or more sub-components for performing these tasks.

For instance, as shown in FIG. 2, the data subsystem 204 may include one or more of (i) a data ingestion component 204a configured to ingest an input dataset for a deployed deep learning-based pipeline that includes data for some set of input data variables (e.g., a heterogenous input dataset), (ii) a categorization component 204b configured to assign certain data types to the data for the input data variables included within the input dataset (e.g., a numerical data type, a categorical data type, or a time-based data type), (iii) a batching component 204c configured to split the data for each of the input data variables into sequences of data blocks to allow for batch processing of such data, (iv) a transformation component 204d configured to select and apply certain transformation operations to the data for the input data variables (e.g., in a batch manner on the sequences of data blocks), including encoding operations corresponding to the assigned data types and perhaps other transformation operations as well (e.g., data aggregation operations, data sampling operations, re-ordering operations, etc.), and (v) a compression component 204e configured to generate a compressed data structure that includes the transformed data for the input data variables and then pass the compressed data structure to the model subsystem 206 for use in training a deep learning model. Example functions performed by these components are explained in further detail below in connection with FIG. 4.

In addition to performing such functions in order to prepare a feature dataset for training a deep learning model (i.e., a training dataset), the data subsystem 204 may also be configured to perform similar functions to prepare other feature datasets that may be utilized by the example subsystem 200 during the process of building a deep learning model. As one example, the data subsystem 204 may perform similar functions for preparing an "in-time" validation dataset, which comprises a feature dataset derived based on input data from a same time period as the training dataset and is to be used by the example subsystem 200 during the course of the training process to assist with certain aspects of that process (e.g., for selecting the hyperparameters and/or determining when to stop the training process to avoid overfitting). As another example, the data subsystem 204 may perform similar functions for preparing an "in-time" test dataset, which comprises a feature dataset derived based on input data from a same time period as the training dataset and is to be used by the example subsystem 200 to test and evaluate the trained deep learning model. As yet another example, the data subsystem 204 may perform similar functions for preparing one or more "out-of-time" test datasets, each of which comprises a feature dataset derived based on input data from a time period that is different from the time period of the training dataset and is to be used by the example subsystem 200 to test and evaluate the trained deep learning model (e.g., as a means for performing an application-specific evaluation of the deep learning model). Other examples are possible as well.

It should also be understood that these different feature datasets may not have symmetric relationships. For instance, in practice, the applied data transformations may be "trained" or fit on the training dataset only, and then applied to the others so there is no leakage of information. Other examples are possible as well.

The data subsystem 204 may include various other sub-components and perform various other functions as well.

c. Model Subsystem

At a high level, the model subsystem 206 may be configured to perform certain functions of a deployed deep learning-based pipeline that are related to training a deep learning model, which may involve applying a machine learning process (e.g., a select set of one or more machine learning techniques) to the transformed data included within a compressed data structure that is provided by the data subsystem 204. In this respect, the model subsystem 206 may be configured to carry out a training process for a deep learning model that takes any of various forms, including but not limited to a deep learning model comprising an artificial neural network that includes one or more of recurrent neural network components, convolutional neural network components, attention-based neural network components, and/or exotic neural network components, among various other possibilities. Further, the model subsystem 206 may be also capable of carrying out a training process for an ensemble model that comprises multiple individual deep learning models (or other types of data science models), which may leverage the benefits of using multiple models.

The model subsystem 206 may accomplish these tasks in various ways, and in some examples, the model subsystem 206 may include one or more sub-components performing these tasks. For instance, as shown in FIG. 2, the model subsystem 206 may include one or more of (i) a recurrent neural network component 206a, (ii) a convolutional neural network component 206b, (iii) an attention-based neural network component 206c, (iv) an exotic architecture component 206d, (v) a regularization component 206e, and (vi) a workflow recovery component 206f.

The recurrent neural network component 206a may be configured to train a deep learning model having recurrent neural network components by applying any recurrent neural network technique now known or later developed to transformed data within a compressed data structure that is provided by the data subsystem 204.

The convolutional neural network component 206b may be configured to train a deep learning model having convolutional neural network components by applying any convolutional neural network technique now known or later developed to transformed data within a compressed data structure that is provided by the data subsystem 204.

The attention-based neural network component 206c may be configured to train a deep learning model having attention-based neural network components by applying any attention-based neural network technique now known or later developed to transformed data within a compressed data structure that is provided by the data subsystem 204.

The exotic architecture component 206d may be configured to train a deep learning model having exotic neural network components by applying any exotic neural network technique now known or later developed to transformed data within a compressed data structure that is provided by the data subsystem 204. In this respect, an "exotic" neural network technique may generally refer to any of various neural network techniques that do not fall within the scope of the other neural network techniques described herein, and may include customized application-specific techniques, among other possibilities.

The regularization component 206e may be configured to apply a regularization technique during a training process being carried out by the model subsystem 206 (e.g., via the recurrent neural network component 206a, the convolutional neural network component 206b, the attention-based neural network component 206c, and/or the exotic architecture component 206d). Such a regularization technique may be configured to prevent or reduce overfitting of the models, and may comprise any regularization technique now known or later developed.

The workflow recovery component 206f may be configured to capture and store snapshots of a training process being carried out by the model subsystem 206 (e.g., via the recurrent neural network component 206a, the convolutional neural network component 206b, the attention-based neural network component 206c, and/or the exotic architecture component 206d). This functionality of capturing and storing snapshots of a training process being carried out by the model subsystem 206 may be utilized for various purposes.

As one possibility, this functionality of capturing and storing snapshots of a training process being carried out by the model subsystem 206 may enable the training process to be reverted to a previous point during the course of the training and then the training process can resume from that previous point. In this respect, if an error or some other issue arises during the training process that requires it to be re-run (e.g., the deep learning model is updated in a way that negatively affects the model's performance), the workflow recovery component 206f enables the model subsystem 206 to re-run the training process from some previous point during the course of the training as opposed to having to re-run the entire training process from the beginning, which allows the training process to be carried out in a quicker and more efficient manner.

As another possibility, this functionality of capturing and storing snapshots of a training process being carried out by the model subsystem 206 may enable the training process to be paused and then resumed at a later time. For example, in response to receiving an instruction to pause a model training process (e.g., based on user input via a client station), the workflow recovery component 206f may capture and store a snapshot representative of the current state of the training process being carried out by the model subsystem 206 and cause the model subsystem 206 to stop the training process. Then, at a later time, in response to receiving an instruction to resume the training process, the workflow recovery component 206f may cause the model subsystem 206 to resume the training process starting from the state represented by the captured snapshot.

The model subsystem 206 may include various other sub-components and perform various other functions as well.

d. Training & Evaluation Subsystem

At a high level, the training and evaluation subsystem 208 may be configured to perform functions related to training, evaluating, and updating deep learning models being trained by the model subsystem 206 in accordance with a deployed deep learning-based pipeline. The training and evaluation subsystem 208 may accomplish these tasks in various ways, and in some examples, the training and evaluation subsystem 208 may include one or more sub-components for performing such functions. For instance, as shown in FIG. 2, the training and evaluation subsystem 208 may include one or more of (i) a feature importance component 208a, (ii) a model performance component 208b, (iii) a hyperparameter tuning component 208c, (iv) a model visualizations component 208d, and (v) a customized training component 208e.

The feature importance component 208a may be configured to evaluate a respective importance of each of the different feature variables that have been input into the training process for the deep learning model (e.g., the transformed versions of the input data variables), where such importance information may then be used as a basis for aiding the training process for the deep learning in some way and/or updating the deep learning model in some way after the training process has completed. For instance, the feature importance component 208a may be configured to determine how useful each respective feature variable is at predicting a value of a target variable of the deep learning model and assign an importance "score" to the respective feature variable based on its determined usefulness, which may then be presented to a user via a visualization and/or may be provided to the model subsystem 206.

The model performance component 208b may be configured to evaluate the performance of a deep learning model being trained by the model subsystem 206 in accordance with a deployed deep learning-based pipeline, and the results of this evaluation may then be used as a basis for aiding the training process for the deep learning in some way and/or updating the deep learning model in some way after the training process has completed. This evaluation may take various forms. As one possibility, the model performance component 208b may evaluate the cost-sensitive loss of a deep learning model (either during or after training) using a cost-sensitive loss function, which may be customized by a user of the functional subsystem 200 based on the intended use case for the deep learning model. As another possibility, the model performance component 208b may evaluate the population-sensitive loss of a deep learning model (either during or after training) using a population-sensitive loss function, which may be customized by a user of the functional subsystem 200 based on the intended use case for the deep learning model. The model performance component's evaluation of the performance of a deep learning model may take other forms as well.

To illustrate with one specific example, the model performance component 208b could be configured to evaluate the cost-sensitive loss and/or the population-sensitive loss of a deep learning model during the model subsystem's training of that deep learning model, and based on that evaluation, the model performance component 208b may then provide certain information to the model subsystem 206 that may cause the model subsystem 206 to alter the training process for the deep learning model in some way. The model performance component 208*b* and the model subsystem 206 may also be configured to iteratively perform these functions throughout the course of the training process in order to continue improving the cost-sensitive loss and/or the population-sensitive loss of the deep learning model.

The hyperparameter tuning component 208*c* may be configured to update a set of hyperparameters for a deep learning model being trained by the model subsystem 206 in accordance with a deployed deep learning-based pipeline during the course of the training process and/or after the training process is completed in order to optimize (or at least improve) the performance of the deep learning model. The hyperparameter tuning component 208*c* may be configured to perform this hyperparameter tuning using any tuning technique now known or later developed, examples of which may include a grid search technique, a random search technique, a Bayesian technique, a gradient-based technique, an evolutionary technique, a population-based technique, or an early stopping-based technique.

The model visualizations component 208*d* may be configured to generate, for display to a user, a graphical representation of certain characteristics of a deep learning model being trained by the model subsystem 206 in accordance with a deployed deep learning-based pipeline, where such visualizations may then be used as a basis for aiding the training process for the deep learning in some way and/or updating the deep learning model in some way after the training process has completed. The characteristics that are visualized take any of various forms, examples of which may include computing resource usage parameters associated with a trained deep learning model, model performance parameters associated with a trained deep learning model, and gradient and path information for a trained deep learning model, among other possibilities.

The customized training component 208*e* may be configured to enable customized training of a deep learning model being trained by the model subsystem 206 in accordance with a deployed deep learning-based pipeline. For example, the customized training component 208*e* may be configured to change aspects of the training process for a given deep learning model, such as by specifying a different backpropagation algorithm. As another example, the customized training component 208*e* may be configured to perform a transfer learning technique in which the customized training component 208*e* applies certain aspects of one deep learning model (e.g., certain model subcomponents) to another deep learning model. The customized training component 208*e* may be configured to perform other functions as well.

The training and evaluation subsystem 208 may include various other sub-components and perform various other functions as well.

Advantageously, these sub-components of the training and evaluation subsystem 208 may enable information about the input dataset and/or the intended use case of the deep learning model to be utilized to customize the training, evaluation, and/or updating of a deep learning model.

e. Platform Subsystem

At a high level, the platform subsystem 210 may be configured to manage and allocate the computing resources of the computing platform that are used to deploy a deep learning-based pipeline (e.g., managing and allocating computing resources in a way that helps improve performance and/or cost when executing the pipeline. The platform subsystem 210 may accomplish these tasks in various ways, and in some examples, the platform subsystem 210 may include one or more sub-components for managing and allocating the computing resources in a way that helps improve performance and/or cost when executing the pipeline. For instance, as shown in FIG. 2, the platform subsystem 210 may include one or more of (i) a resource allocation component 210*a*, (ii) a graphics processing unit (GPU) scaling component 210*b*, (iii) a central processing unit (CPU) scaling component 210*c*, and (iv) a precision policy component 210*d*.

The resource allocation component 210*a* may be configured to determine the extent and/or type of computing resources (both physical and virtual) that are to be allocated for the deployment of a deep learning-based pipeline (e.g., the computing resources utilized by the data subsystem 204 and/or the model subsystem 206 to deploy the deep learning-based pipeline). In this respect, the resource allocation component 210*a* may determine the extent and/or type of computing resources (e.g., how many processing cores, how much memory, etc.) based on factors such as (i) the size of the input dataset, (ii) an estimate of the extent of computing resources that will be required to execute the deep learning-based pipeline, (iii) how parallelizable the deep learning model is expected to be and an associated parallelization structure (e.g., determining which components of the deep learning model can be partially or entirely parallelized and which components cannot), and (iv) an expected real-world performance of the computing resources that are to be allocated for the deployment of a deep learning-based pipeline (which may differ from the theoretical performance of the computing resources), among others.

The GPU scaling component 210*b* may be configured to scale the GPU computing resources that are utilized for the deployment of a deep learning-based pipeline (e.g., the GPU computing resources utilized by the data subsystem 204 and/or the model subsystem 206 when the deep learning-based pipeline is deployed). The GPU scaling component 210*b* may apply this scaling to a single GPU or to multiple GPUs.

The CPU scaling component 210*c* may be configured to scale the CPU computing resources that are utilized for the deployment of a deep learning-based pipeline (e.g., the CPU computing resources utilized by the data subsystem 204 and/or the model subsystem 206 when the deep learning-based pipeline is deployed). The CPU scaling component 210*c* may apply this scaling to a single CPU or to multiple CPUs.

The precision policy component 210*d* may be configured to establish the precision policy that is utilized for the deployment of a deep learning-based pipeline (e.g., the level of precision used by the data subsystem 204 and/or the model subsystem 206 when performing computations in accordance with the deployed deep learning-based pipeline). In line with the discussion above, this precision policy may then be referenced by other functional subsystems when performing functions in accordance with a deployed deep learning-based pipeline (e.g., generating a compressed data structure containing the transformed data for the input data variables). The precision policy established by the precision policy component 210*d* may be based on information about the intended use case of the deep learning model, the computing resources that are to be used to deploy the deep learning-based pipeline, and/or business knowledge, among other possibilities.

The platform subsystem 210 may include various other sub-components and perform various other functions as well.

Advantageously, these sub-components of the platform subsystem 210 may enable a deep learning-based pipeline to be executed in a way that is better suited for deployment in a cloud computing environment.

IV. EXAMPLE DEEP LEARNING PIPELINE CONFIGURATION TECHNIQUES

Figure 3:
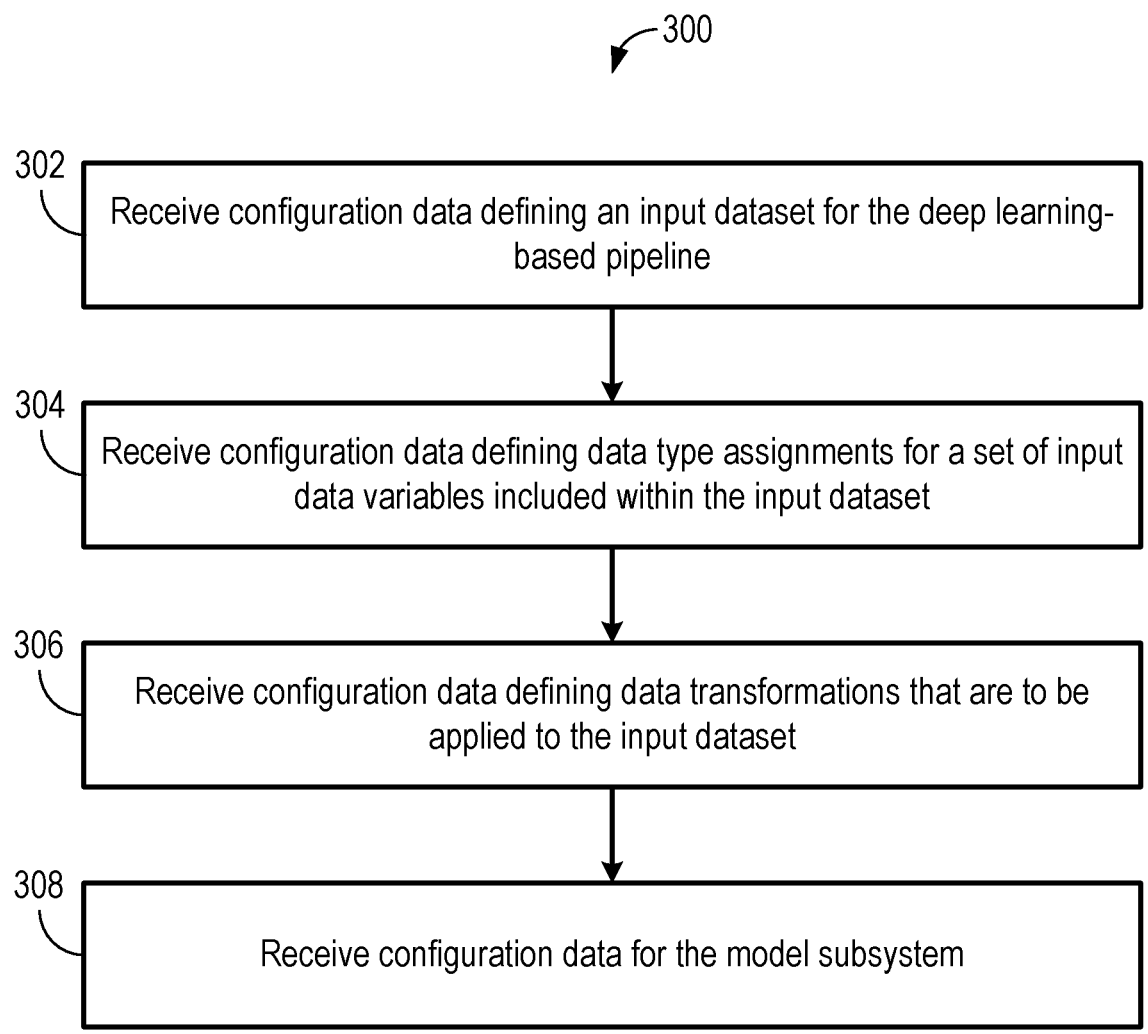
FIG. 3 depicts a flow diagram of an example process for configuring a deep learning-based pipeline using the functional subsystem of FIG. 2 according to aspects of the disclosed technology.

Turning now to FIG. 3, a flow diagram of an example process 300 that may be carried out in order to facilitate the configuration of a new deep learning-based pipeline is shown. For purposes of illustration only, example process 300 is described as being carried out by the pipeline configuration subsystem 202 of FIG. 2, but it should be understood that the example process 300 may be carried out by a functional subsystem that takes other forms as well. Further, it should be understood that, in practice, these functions may be encoded in the form of program instructions that are executable by one or more processors of a computing platform. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 3, at block 302, the pipeline configuration subsystem 202 may receive configuration data defining an input dataset for the deep learning-based pipeline. The configuration data defining an input dataset for the deep learning-based pipeline may include data defining (i) a set of input data variables for the deep learning-based pipeline and/or (ii) a data source from which data for the set of input data variables is to be obtained, among other possibilities.

At block 304, the pipeline configuration subsystem 202 may receive configuration data defining data type assignments for a set of input data variables included within the input dataset. The configuration data defining the data type assignments for the set of input data variables may include (i) data defining the set of possible data types that can be assigned to the input data variables and (ii) data defining which of the data types are to be assigned to which of the input data variables. As an example to illustrate, the defined set of possible data types could include a numerical data type, a categorical data type, and a time-based data type (among other possibilities), and the configuration data defining the data type assignments may then comprise, for each of these data types, a listing of the input data variables that are to be assigned the data type (e.g., a first listing of the input data variables that are to be assigned a numerical data type, a second listing of the input data variables that are to be assigned a categorical data type, and a third listing of the input data variables that are to be assigned a time-based data type).

Further, in addition to defining the data type assignments for the set of input data variables, this configuration data may also define a data type assignment for one or more additional variables that are dependent upon the input data variables (e.g., a dependent variable that is to be derived based on the data for one or more of the input data variables), where such dependent variables may be defined based on business knowledge or the like. One representative example of such a dependent variable may comprise a categorical indicator of whether or not a financial transaction was processed at a gas station, which may be defined based on business knowledge indicating that financial transactions processed at gas stations tend to be associated with a higher risk of fraudulent activity. Another representative example of such a dependent variable may comprise a numerical indicator counting the number of low dollar authorizations after a recent request for technical support, which may be defined based on business knowledge indicating that low dollar authorizations after a recent request for technical support tend to be associated with fraudulent activity. Many other examples are possible as well.

Further yet, this configuration data may additionally define relationships between input data variables of different data types. For instance, the configuration data may include instructions for using an input data variable of one type to transform or reorder an input data variable of another type. One example of such configuration data may comprise instructions for using values of a time-based input data variable to reorder values of a numerical or categorical input data variable. Many other examples are possible as well.

Advantageously, this configuration data defining the data type assignments enables data type assignments to be carried out that are based on business knowledge and would be difficult to carry out automatically. For example, an input data variable with values that take the form of numerical codes (e.g., "1111", "2222", "3333") can appear as a numerical-type of data variable, but business knowledge may reveal that this is actually a categorical-type of data variable and can be designated as such by the configuration data defining the data type assignments. As another example, an input data variable with values that take the form of several ordered integer values (e.g., "0", "1", "2", "3", "4") can appear as a numerical-type of data variable, but business knowledge may reveal that this is actually a categorical-type of data variable reflecting codes and can be designated as such by the configuration data defining the data type assignments. However, it should also be understood that the configuration data defining the data type assignments may not include a data type assignment for every input data variable, in which case the data subsystem 204 may be configured to determine a data type of an input data variable based on the data that is received for that data variable.

At block 306, the pipeline configuration subsystem 202 may receive configuration data defining data transformations that are to be applied to the input dataset, which may take various forms. As one possibility, the data defining the data transformations that are to be applied to the input dataset may comprise data defining at least one encoding operation corresponding to each of the possible data types that can be assigned to the input variables.

For example, if the defined set of possible data types includes a numerical data type, a categorical data type, and a time-based data type, the data defining the data transformations that are to be applied to the input dataset may define (i) a first encoding operation for input data variables assigned the numerical data type (e.g., an encoding operation for scaling with a range defined by min and max values, or standardizing values by subtracting mean and dividing by standard deviation, or others such as log and quantile/decile transform), (ii) a second encoding operation for input data variables assigned the categorical data type (e.g., a one-hot encoding operation, an encoding operation for numerical transformation, or an algorithm-specific encoding operation for like CatBoost, sklearn, or category_encoder python packages), and (iii) a third encoding operation for input data variables assigned the time-based data type (which can be used to perform functions such as ordering, sampling, and/or aggregating other data over time rather than passing directly, or to extract features such as hour/day/difference to previous timestamp and feeding those directly as numerical or categorical variables). Many other examples are possible as well—including but not limited to the possibility that the data transformations that are to be applied to the input dataset may include more than one encoding operation for input data variables assigned to a given data type and/or that a given encoding operation could be applied to multiple different data types.

Additionally or alternatively, a given input data variable could have its value encoded into more than one data type. One example of such data transformation may involve encoding a timestamp value having a time-based data type as both the time-based data type and also a numerical data type (e.g., an hour value). Another example may involve encoding a timestamp value having a time-based data type as both the time-based data type and also a categorical data type (e.g., an "a.m." or "p.m." value). Many other examples are possible as well. In this respect, the encoding operations that are to be applied to the input dataset may be defined based on business or domain knowledge.

As another possibility, the data defining the data transformations that are to be applied to the input dataset may comprise data defining various other transformations that are to be applied to certain input data variables, examples of which may include (i) a data aggregation operation that aggregates values of an input data variable over time, (ii) a data sampling operation that samples the values of an input data variable over time, (iii) a re-ordering operation that rearranges the order of values for an input data variable (either across multiple input data records or within a single input data record if that input data record contains multiple values for the input data variable), and/or (iv) a missing value operation that replaces missing or unusable values for an input data variable with usable values, among various other possibilities. In this respect, it should be understood that such transformation operations may serve to modify the data values of an input data variable, derive a new dependent data variable based on one or more input data variables, or some combination thereof.

At block 308, the pipeline configuration subsystem 202 may receive configuration data for the model subsystem 206. The configuration data for the model subsystem 206 may include information specifying one or more of (i) a type of data science model to be trained (e.g., a long short-term memory (LSTM) model, which the model subsystem 206 may train using the recurrent neural network component 206a), (ii) a size or scale of the data science model, (e.g., a number of units or nodes to include in the data science model), (iii) a dropout parameter indicating a number of units or nodes to randomly ignore during training to assist with regularization of the model, (iv) an activation function for one or more units or nodes of the model, (v) a number of attention units to apply during training and/or a configuration of the attention units (e.g., configuration data identifying which units an attention technique should be applied to), or (vi) whether the model subsystem 206 is to train the model to be bidirectional.

Based on the configuration information received by the pipeline configuration subsystem 202 as part of the example process 300 depicted in FIG. 3, the example subsystem 200 for building data science models may deploy a deep learning-based pipeline for building a deep learning model, as described in further detail below in connection with FIG. 4. In this way, the disclosed technology may advantageously enable data scientists or other professionals to configure and deploy deep learning-based pipelines (or other pipelines for building data science models) in a quicker and more efficient way because certain aspects of the process for configuring and deploying the pipeline are automated and there is less user input required than in existing software applications for building deep learning models.

V. EXAMPLE DEEP LEARNING PIPELINE EXECUTION TECHNIQUES

Figure 4:
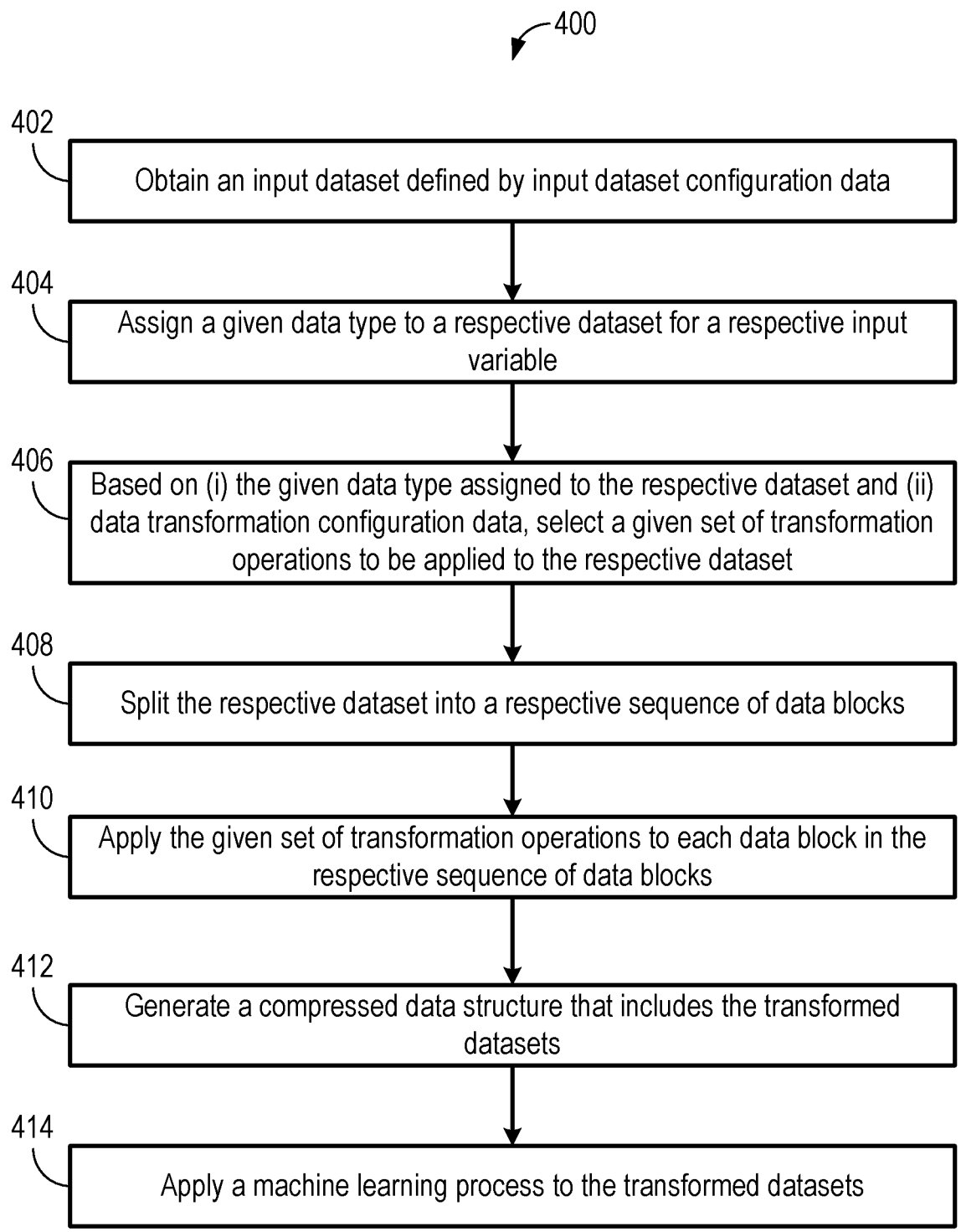
FIG. 4 depicts a flow diagram of an example process for building and executing a deep learning model using the functional subsystem of FIG. 2 according to aspects of the disclosed technology.

Turning now to FIG. 4, a flow diagram of an example process 400 that may be carried out in connection with a deployed deep learning-based pipeline to build a deep learning model. For purposes of illustration only, certain functions of the example process 400 are described as being carried out by certain subsystems and components of the example subsystem for building deep learning models 200 of FIG. 2, but it should be understood that the example process 400 may be carried out by a functional subsystem that takes other forms as well. Further, it should be understood that, in practice, these functions may be encoded in the form of program instructions that are executable by one or more processors of a computing platform. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As noted above, the example process 400 may be carried out after the pipeline configuration subsystem 202 has received configuration data that defines a pipeline for building a deep learning model. As described above in connection with FIG. 3, the configuration data may include configuration data defining (i) an input dataset for the pipeline (e.g., the configuration data received at block 302 of FIG. 3), (ii) data type assignments for a set of input data variables included within the input dataset (e.g., the configuration data received at block 304 of FIG. 3), (iii) data transformations that are to be applied to the input dataset (e.g., the configuration data received at block 306 of FIG. 3), and (iv) a machine learning process that is to be utilized to train the deep learning model (e.g., the configuration data received at block 308 of FIG. 3).

As shown in FIG. 4, the example process 400 may begin at block 402 with the data ingestion component 204a of the data subsystem 204 obtaining the input dataset that is defined by the configuration data. In line with the discussion above, the configuration data may further define a set of input data variables, and the input dataset may include a respective dataset for each respective input data variable in the set of input data variables.

The input dataset obtained by the data ingestion component 204a may take various forms. As a starting point, in at least some implementations, the input dataset may be heterogenous in the sense that the data within each of the different dimensions of the dataset is not uniform. For instance, the input dataset may comprise a collection of data records that each includes data for at least a respective subset of the input data variables, and in each such data record, the data for certain of the included input data variables may comprise a list of multiple discrete values (e.g., a sequence of historical values for a given input variable). In this respect, the input dataset may be viewed to have three dimensions: (i) a first dimension that corresponds to the collection of data records, (ii) a second dimension that corresponds to the set of input data variables for which data is included in the data records, and (iii) a third dimension that corresponds to the number of values that may be included in the data records for the different input data variables. However, it will be appreciated that data within each of these different dimensions may not uniform.

For instance, while each data record may include data for at least a respective subset of the input data variables, the subsets of input data variables for the data records may differ from record-to-record. As a result, the collection of data records may not all have data for the same input data variables, which means that the data may not be uniform within the second dimension that corresponds to the set of input data variables for which data is included in the data records. Instead, the data within that second dimension may be "jagged" in the sense that each data record may be missing data values for one or more of the input data variables across the input dataset.

Further, the number of values that are included in the data records for each of the different input variables may vary from record-to-record and variable-to-variable. For example, when looking at the values across the collection of data records for a particular input data variable, a first data record could have a multiple-value list comprising a larger number of discrete values for that input data variable (e.g., 10 or more), a second data record could have a multiple-value list comprising a smaller number of discrete values for that input data variable (e.g., less than 10), a third data record could have just one single value for that input data variable, and then a fourth data record may not have any value at all for the input data variable. As a result, the data may not be uniform within the third dimension that corresponds to the number of values that may be included in the data records for the different input data variables. Instead, the data within that third dimension may be "jagged" in the sense that the number of values included in the data records for each of the different input variables may vary from record-to-record and variable-to-variable.

To illustrate with a real-world example in the context of the financial industry, the input dataset could comprise a collection of data records that each correspond to a respective customer of a financial industry. In this respect, the universe of data variables included in these customer data records may comprise any data variables that provide relevant information for a customer of a financial institution, including but not limited to a set of data variables that provide information about transactions involving a customer (e.g., transaction amount, merchant ID, timestamp, location, Point of Sale terminal ID, whether a chip was used, etc.), a set of data variables that provide account-level information about a customer (e.g., personal identification information, a status of the customer's account such as active or closed, account details such as credit limit available, etc.), and/or a set of data variables that provide information about a customer's interactions with the financial institution (e.g., mobile or web account login history and interaction details, etc.).

Further, the data for several of these data variables could take the form of multi-value lists. For example, the data variables that provide information about transactions involving a customer may comprise data that takes the form of multiple-value lists that provide information about historical transactions involving the customer over some period of time. As another example, data variables that provide information about a customer's interactions with the financial institution may comprise data that takes the form of multiple-value lists that provide information about a customer's historical interactions with the financial institution over some period of time. As still example, a data variable that provides a status of a customer's account may comprise data that takes the form of a multiple-value list that provides historical status information over some period of time. Many other examples are possible as well. Thus, in this real-world example, the input dataset may be viewed to have three dimensions: (i) a first dimension that corresponds to the customer records, (ii) a second dimension that corresponds to the set of customer-related data variables, and (iii) a third dimension that corresponds to the number of values that may be included in the customer records for the different customer-related data variables. However, as above, it will be appreciated that data within each of these different dimensions may not uniform.

For instance, the collection of customer records may not all have data for the same customer-related data variables, and the number of values that are included in the customer records for each of the different customer-related data variables may vary from record-to-record and from variable-to-variable. As a result, the data may not be uniform within the second or third dimensions of the input dataset; rather, the data within those dimensions may be jagged.

It should also be understood that the input dataset may include more than three dimensions. For example, certain customer records may comprise information for multiple distinct accounts, which may be treated as another dimension of the input dataset. As another example, certain data variables may comprise multiple different sub-variables (e.g., a customer interaction data variable may comprise sub-variables for interactions through different communication channels), which may be treated as other dimensions of the input dataset. Other examples are possible as well.

The functionality of the data subsystem 204 that is described below may be well suited for handling and processing input datasets having this type of heterogenous structure. For instance, while the input dataset may comprise a collection of data records comprising different data structures for different input data variables, the data subsystem 204 may be configured to parse the input dataset into a respective dataset for each of a set of data input variables and then process the respective dataset for each such data variable in the manner described below. This enables the data subsystem 204 to perform variable-level processing on the input dataset while still preserving the overall structure of the input dataset, which embodies relationships and patterns that can be leveraged by the machine learning process for training the deep learning model in order to improve the predictive power of that deep learning model and/or change the predictive profile of the deep learning model based on factors such as the cost of predictions, the populations predicted on, and/or a more targeted subset of training data, among other possibilities. For example, with respect to type of input dataset discussed above for customers of a financial institution, the disclosed technology may allow customer action and event data to be collected and encoded at an account level, which enables deep learning models to benefit from available account history and a person/entity-level perspective, while still producing per-action and/or event decision predictions as output.

Referring back to FIG. 4, at blocks 404 through 410, the data subsystem 204 may perform a set of data processing operations in connection with each respective input data variable in the set of input data variables. For simplification purposes, these blocks will now be described in the context of one respective input data variable in the set of input data variables but should be understood to apply to each respective input data variable in the set of input data variables.

At block 404, the categorization component 204b of the data subsystem 204 may assign a given data type to the respective dataset for the respective input data variable based at least in part on the configuration data defining the data type assignments. In line with the discussion above, the given data type assigned to the respective dataset for the respective input data variable may include one of (i) a numerical data type, (ii) a categorical data type, or (iii) a time-based data type.

At block 406, based on the given data type assigned to the respective dataset for the respective input data variable and the configuration data defining the data transformations that are to be applied to the input dataset, the transformation component 204d of the data subsystem 204 may select a given set of one or more transformation operations that are to be applied to the respective dataset for the respective input data variable. In line with the discussion above, the given set of one or more transformation operations that are to be applied to the respective dataset for the respective input data variable may include an encoding operation that corresponds to the given data type assigned to the respective dataset for the respective input data variable. Additionally or alternatively, the given set of one or more transformation operations that are to be applied to the respective dataset for the respective input data variable may include one or more of (i) a data aggregation operation, (ii) a data sampling operation, (iii) a re-ordering operation, or (iv) a missing value operation.

In some implementations, the selection of the given set of one or more transformation operations that are to be applied to the respective dataset for the respective input data variable could also be based on the values included within the respective dataset. For example, the transformation component 204d of the data subsystem 204 may be configured to evaluate the distribution of the values included within the respective dataset for the respective input data variable and then select which one or more transformation operations to apply based on that distribution (e.g., by using different transformation operations depending on whether the values are heavily skewed on one side of the distribution versus whether the values have a more normal or Gaussian distribution).

At block 408, the batching component 204c of the data subsystem 204 may split the respective dataset for the respective input data variable into a respective sequence of data blocks for the respective input data variable. In line with the discussion above, such splitting may involve splitting the respective dataset for the respective input data variable into a respective sequence of data blocks having a block size that is defined based on one or both of (i) available computational resources of the computing platform or (ii) the given set of one or more transformation operations that are to be applied to the respective dataset.

At block 410, the transformation component 204d of the data subsystem 204 may apply the given set of one or more transformation operations to each data block in the respective sequence of data blocks for the respective input data variable in order to produce a transformed dataset for the respective input data variable. In line with the discussion above, applying the given set of one or more transformation operations may involve applying an encoding operation that corresponds to the given data type assigned to the respective dataset for the respective input data variable. Additionally or alternatively, applying the given set of one or more transformation operations may involve applying one or more of (i) a data aggregation operation, (ii) a data sampling operation, (iii) a re-ordering operation, or (iv) a missing value operation.

At block 412, once the data subsystem 204 has performed the set of data processing operations at blocks 404 through 410 in connection with each respective input data variable in the set of input data variables, the compression component 204e of the data subsystem 204 may generate a compressed data structure that includes the transformed datasets for the set of input data variables. In line with the discussion above, generating the compressed data structure that includes the transformed datasets for the set of input data variables may include (i) compiling the transformed datasets for the set of input data variables into an initial data structure and (ii) compressing the initial data structure using a compression technique that is selected based on one or more of (a) a computational architecture of the computing platform or (b) a precision policy of the computing platform.

At block 414, the model subsystem 206 may apply the machine learning process defined by the configuration data to the transformed datasets for the set of input data variables that are included within the compressed data structure. In some examples, applying the machine learning process may involve (i) decompressing the compressed data structure, (ii) extracting the transformed datasets for the set of input data variables from the decompressed data structure, and (iii) inputting the transformed datasets for the set of input data variables into the machine learning process.

While the example process 400 depicted in FIG. 4 describes the data subsystem 204 performing various functions for preparing a feature dataset that is delivered to the model subsystem 206 and used for training a data science model, the data subsystem 204 may also perform similar functions in order to prepare other feature datasets that may be utilized by the example subsystem 200 during the process of building a deep learning model. For example, in line with the discussion above, the data subsystem 204 could perform similar functions for preparing a validation dataset, an "in-time" test dataset, and/or an "out-of-time" test dataset, and the data subsystem 204 may then deliver such datasets to another subsystem such as the training and evaluation subsystem 208—which may then use such datasets for performing certain functions related to training, evaluating, and updating deep learning models in the manner described above.

VI. EXAMPLE COMPUTING PLATFORM

Figure 5:
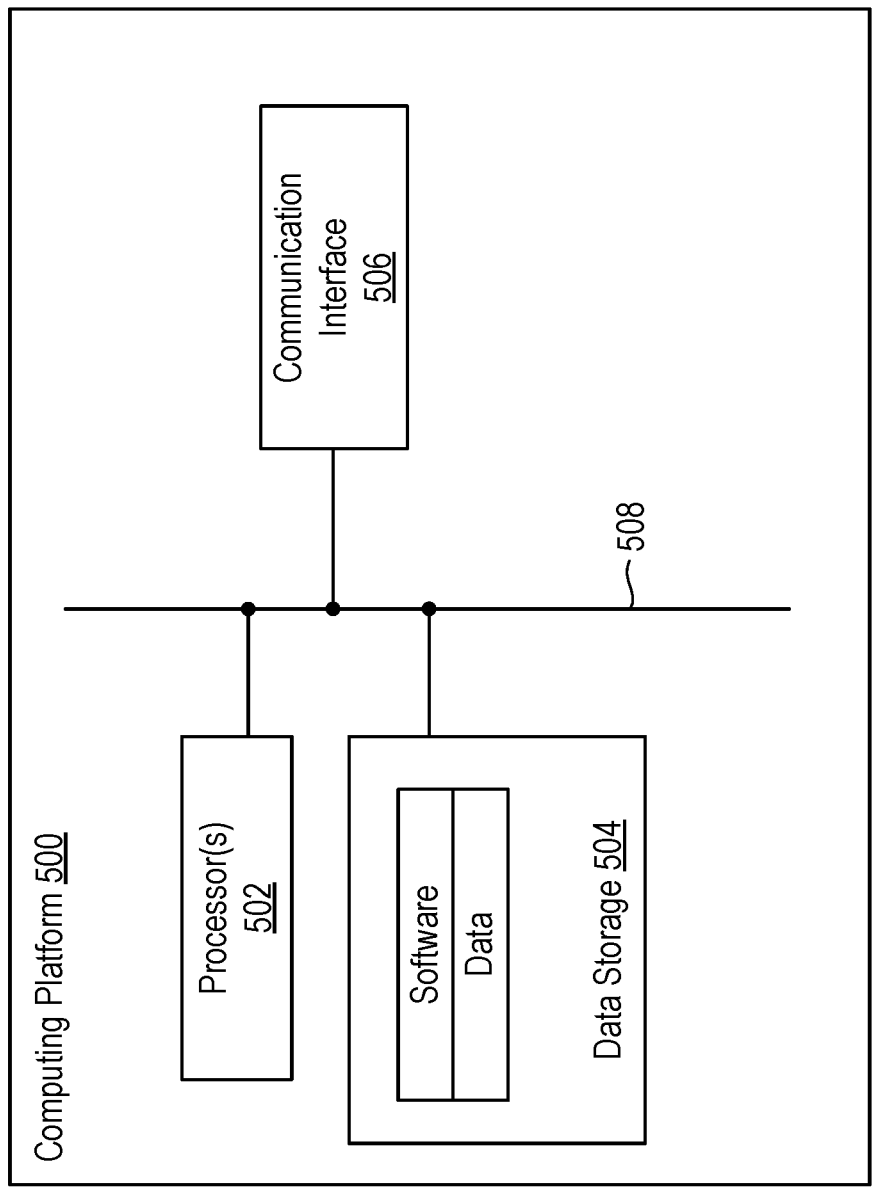
FIG. 5 depicts example structural components of an example computing platform that may be configured to perform various functions of the functional subsystem of FIG. 2 according to aspects of the disclosed technology.

Turning now to FIG. 5, a simplified block diagram is provided to illustrate some structural components that may be included in an example computing platform 500, which may be configured to host and execute the new software technology disclosed herein. As shown in FIG. 5, the example computing platform 500 may include at least a processor 502, data storage 504, and a communication interface 506, all of which may be communicatively linked by a communication link 508 that may take the form of a system bus, a communication network such as a public, private, or hybrid cloud, or some other connection mechanism.

Processor 502 may comprise one or more processing components, such as general-purpose processors (e.g., a single- or multi-core CPU), special-purpose processors (e.g., a GPU, application-specific integrated circuit (ASIC), or digital-signal processor (DSP)), programmable logic devices (e.g., a field programmable gate array), controllers (e.g., microcontrollers), and/or any other processor components now known or later developed. In line with the discussion above, it should also be understood that processor 502 could comprise processing components that are distributed across a plurality of physical computing devices connected via a network, such as a computing cluster of a public, private, or hybrid cloud.

In turn, data storage 504 may comprise one or more non-transitory computer-readable storage mediums that are collectively configured to store (i) program instructions that are executable by processor 502 such that computing platform 500 is configured to perform certain functions in connection with building and executing a deep learning-based pipeline, and (ii) data that may be received, derived, or otherwise stored, for example, in one or more databases, file systems, repositories, or the like, by computing platform 500, in connection with building and executing a deep learning-based pipeline. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 504 may comprise computer-readable storage mediums that are distributed across a plurality of physical computing devices connected via a network, such as a storage cluster of a public, private, or hybrid cloud. Data storage 504 may take other forms and/or store data in other manners as well.

Communication interface 506 may be configured to facilitate wireless and/or wired communication with client stations (e.g., one or more client stations 108 of FIG. 1) and/or third-party computing platforms. Additionally, in an implementation where the computing platform 500 comprises a plurality of physical computing devices connected via a network, communication interface 506 may be configured to facilitate wireless and/or wired communication between these physical computing devices (e.g., between computing and storage clusters in a cloud network). As such, communication interface 506 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, one or more APIs and/or an API gateway, and/or any other interface that provides for wireless and/or wired communication. Communication interface 506 may also include multiple communication interfaces of different types. Other configurations are possible as well.

Although not shown, the computing platform 500 may additionally include or have an interface for connecting to user-interface components that facilitate user interaction with computing platform 500, such as a keyboard, a mouse, a trackpad, a display screen, a touch-sensitive interface, a stylus, a virtual-reality headset, and/or speakers, among other possibilities.

It should be understood that the computing platform 500 is one example of a computing platform that may be used with the embodiments described herein. Numerous other arrangements are possible and contemplated herein. For instance, in other embodiments, the computing platform 500 may include additional components not pictured and/or more or fewer of the pictured components.

VII. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
a network interface;
at least one processor;
at least one non-transitory computer-readable medium; and
program instructions stored on the non-transitory computer-readable medium that are executable by the at least one processor such that the computing platform is configured to:
receive configuration data that defines a pipeline for building a deep learning model, wherein the received configuration data comprises configuration data defining (i) an input dataset for the pipeline, (ii) data type assignments for a set of two or more input data variables included within the input dataset, (iii) data transformations that are to be applied to the input dataset, and (iv) a machine learning process that is to be utilized to train the deep learning model; and
based on the received configuration data, deploy the pipeline for building the deep learning model, wherein, while the pipeline for building the deep learning model is deployed, the computing platform functions to build the deep learning model by:
obtaining the input dataset that is defined by the configuration data, wherein the input dataset is a three-dimensional dataset comprising a collection of data records that each includes variable-specific numbers of data values for the set of two or more input data variables, wherein (i) the collection of data records defines a first dimension of the three-dimensional dataset, (ii) the set of two or more input data variables defines a second dimension of the three-dimensional dataset, and (iii) the variable-specific numbers of data values for the set of two or more input data variables defines a third dimension of the three-dimensional dataset;
for each respective input data variable in the set of two or more input data variables:
extracting, from the input dataset, a respective dataset for the respective input data variable;
assigning a respective data type to a respective dataset for the respective input data variable based at least in part on the configuration data defining the data type assignments;
based on the respective data type assigned to the respective dataset for the respective input data variable and the configuration data defining the data transformations that are to be applied to the input dataset, selecting a given set of one or more transformation operations that are to be applied to the respective dataset for the respective input data variable;
splitting the respective dataset for the respective input data variable into a respective sequence of data blocks for the respective input data variable; and applying the given set of one or more transformation operations to each data block in the respective sequence of data blocks for the respective input data variable in order to produce a transformed dataset for the respective input data variable;

generating a compressed data structure that includes the transformed datasets for the set of two or more input data variables; and applying the machine learning process defined by the configuration data to the transformed datasets for the set of two or more input data variables that are included within the compressed data structure.

2. The computing platform of claim 1, wherein the input dataset comprises a heterogenous input dataset that is not uniform across the second and third dimensions of the input dataset.

3. The computing platform of claim 1, wherein the respective data type that is assigned to the respective dataset for each respective input data variable in the set of two or more input data variables comprises one of (i) a numerical data type, (ii) a categorical data type, or (iii) a time-based data type.

4. The computing platform of claim 1, wherein splitting the respective dataset for the respective input data variable into the respective sequence of data blocks for the respective input data variable comprises:

splitting the respective dataset for the respective input data variable into a respective sequence of data blocks having a block size that is defined based on one or both of (i) available computational resources of the computing platform or (ii) the given set of one or more transformation operations that are to be applied to the respective dataset.

5. The computing platform of claim 1, wherein the given set of one or more transformation operations that are to be applied to the respective dataset for the respective input data variable comprises an encoding operation that corresponds to the respective data type assigned to the respective dataset for the respective input data variable.

6. The computing platform of claim 5, wherein the given set of one or more transformation operations that are to be applied to the respective dataset for the respective input data variable further comprises one or more of (i) a data aggregation operation, (ii) a data sampling operation, (iii) a re-ordering operation, or (iv) a missing value operation.

7. The computing platform of claim 1, wherein generating the compressed data structure that includes the transformed datasets for the set of two or more input data variables comprises:

compiling the transformed datasets for the set of two or more input data variables into an initial data structure; and compressing the initial data structure using a compression technique that is selected based on one or more of (i) a computational architecture of the computing platform or (ii) a precision policy of the computing platform.

8. The computing platform of claim 1, wherein applying the machine learning process defined by the configuration data to the transformed datasets for the set of two or more input data variables that are included in the compressed data structure comprises:

decompressing the compressed data structure;
extracting the transformed datasets for the set of two or more input data variables from the decompressed data structure; and inputting the transformed datasets for the set of two or more input data variables into the machine learning process.

9. The computing platform of claim 1, wherein, within each respective data record in the collection of data records, the variable-specific numbers of data values for the set of two or more input data variables comprise zero data values for each of a respective subset of the set of two or more input data variables.

10. The computing platform of claim 1, wherein the variable-specific numbers of data values for the set of two or more input data variables that are included in the collection of data records are not uniform on either a record-by-record basis or a variable-by-variable basis.

11. A non-transitory computer-readable medium, wherein the non-transitory computer-readable medium is provisioned with program instructions that, when executed by at least one processor, cause a computing platform to:

receive configuration data that defines a pipeline for building a deep learning model, wherein the received configuration data comprises configuration data defining (i) an input dataset for the pipeline, (ii) data type assignments for a set of two or more input data variables included within the input dataset, (iii) data transformations that are to be applied to the input dataset, and (iv) a machine learning process that is to be utilized to train the deep learning model; and based on the received configuration data, deploy the pipeline for building the deep learning model, wherein, while the pipeline for building the deep learning model is deployed, the computing platform functions to build the deep learning model by:

obtaining the input dataset that is defined by the configuration data, wherein the input dataset is a three-dimensional dataset comprising a collection of data records that each includes variable-specific numbers of data values for the set of two or more input data variables, wherein (i) the collection of data records defines a first dimension of the three-dimensional dataset, (ii) the set of two or more input data variables defines a second dimension of the three-dimensional dataset, and (iii) the variable-specific numbers of data values for the set of two or more input data variables defines a third dimension of the three-dimensional dataset;

for each respective input data variable in the set of two or more input data variables:

extracting, from the input dataset, a respective dataset for the respective input data variable;

assigning a respective data type to a respective dataset for the respective input data variable based at least in part on the configuration data defining the data type assignments;

based on the respective data type assigned to the respective dataset for the respective input data variable and the configuration data defining the data transformations that are to be applied to the input dataset, selecting a given set of one or more transformation operations that are to be applied to the respective dataset for the respective input data variable;

splitting the respective dataset for the respective input data variable into a respective sequence of data blocks for the respective input data variable; and applying the given set of one or more transformation operations to each data block in the respective sequence of data blocks for the respective input data variable in order to produce a transformed dataset for the respective input data variable;

generating a compressed data structure that includes the transformed datasets for the set of two or more input data variables; and applying the machine learning process defined by the configuration data to the transformed datasets for the set of two or more input data variables that are included within the compressed data structure.

12. The non-transitory computer-readable medium of claim 11, wherein the input dataset comprises a heterogenous input dataset that is not uniform across the second and third dimensions of the input dataset.

13. The non-transitory computer-readable medium of claim 11, wherein the respective data type that is assigned to the respective dataset for each respective input data variable in the set of two or more input data variables comprises one of (i) a numerical data type, (ii) a categorical data type, or (iii) a time-based data type.

14. The non-transitory computer-readable medium of claim 11, wherein splitting the respective dataset for the respective input data variable into the respective sequence of data blocks for the respective input data variable comprises:

splitting the respective dataset for the respective input data variable into a respective sequence of data blocks having a block size that is defined based on one or both of (i) available computational resources of the computing platform or (ii) the given set of one or more transformation operations that are to be applied to the respective dataset.

15. The non-transitory computer-readable medium of claim 11, wherein the given set of one or more transformation operations that are to be applied to the respective dataset for the respective input data variable comprises an encoding operation that corresponds to the respective data type assigned to the respective dataset for the respective input data variable.

16. The non-transitory computer-readable medium of claim 15, wherein the given set of one or more transformation operations that are to be applied to the respective dataset for the respective input data variable further comprises one or more of (i) a data aggregation operation, (ii) a data sampling operation, (iii) a re-ordering operation, or (iv) a missing value operation.

17. The non-transitory computer-readable medium of claim 11, wherein generating the compressed data structure that includes the transformed datasets for the set of two or more input data variables comprises:

compiling the transformed datasets for the set of two or more input data variables into an initial data structure; and compressing the initial data structure using a compression technique that is selected based on one or more of (i) a computational architecture of the computing platform or (ii) a precision policy of the computing platform.

18. The non-transitory computer-readable medium of claim 11, wherein applying the machine learning process defined by the configuration data to the transformed datasets for the set of two or more input data variables that are included in the compressed data structure comprises:

decompressing the compressed data structure;

extracting the transformed datasets for the set of two or more input data variables from the decompressed data structure; and inputting the transformed datasets for the set of two or more input data variables into the machine learning process.

19. A method carried out by a computing platform, the method comprising:

receiving configuration data that defines a pipeline for building a deep learning model, wherein the received configuration data comprises configuration data defining (i) an input dataset for the pipeline, (ii) data type assignments for a set of two or more input data variables included within the input dataset, (iii) data transformations that are to be applied to the input dataset, and (iv) a machine learning process that is to be utilized to train the deep learning model; and based on the received configuration data, deploying the pipeline for building the deep learning model, wherein, while the pipeline for building the deep learning model is deployed, the computing platform functions to build the deep learning model by:

obtaining the input dataset that is defined by the configuration data, wherein the input dataset is a three-dimensional dataset comprising a collection of data records that each includes variable-specific numbers of data values for the set of two or more input data variables, wherein (i) the collection of data records defines a first dimension of the three-dimensional dataset, (ii) the set of two or more input data variables defines a second dimension of the three-dimensional dataset, and (iii) the variable-specific numbers of data values for the set of two or more input data variables defines a third dimension of the three-dimensional dataset;

for each respective input data variable in the set of two or more input data variables:

extracting, from the input dataset, a respective dataset for the respective input data variable;

assigning a respective data type to a respective dataset for the respective input data variable based at least in part on the configuration data defining the data type assignments;

based on the respective data type assigned to the respective dataset for the respective input data variable and the configuration data defining the data transformations that are to be applied to the input dataset, selecting a given set of one or more transformation operations that are to be applied to the respective dataset for the respective input data variable;

splitting the respective dataset for the respective input data variable into a respective sequence of data blocks for the respective input data variable; and applying the given set of one or more transformation operations to each data block in the respective sequence of data blocks for the respective input data variable in order to produce a transformed dataset for the respective input data variable;

generating a compressed data structure that includes the transformed datasets for the set of two or more input data variables; and applying the machine learning process defined by the configuration data to the transformed datasets for the set of two or more input data variables that are included within the compressed data structure.

20. The method of claim 19, wherein the input dataset comprises a heterogenous input dataset that is not uniform across the second and third dimensions of the input dataset.

* * * * *